S. DAVIDSON AND A. L. SCHRAM.
APPARATUS FOR DELIVERING MOLD CHARGES FROM GLASS FURNACES.
APPLICATION FILED JULY 21, 1917.

1,338,214.

Patented Apr. 27, 1920

INVENTORS
Scott Davidson &
Alexander L. Schram
BY
James L. Hopkins
ATTORNEY

S. DAVIDSON AND A. L. SCHRAM.
APPARATUS FOR DELIVERING MOLD CHARGES FROM GLASS FURNACES.
APPLICATION FILED JULY 21, 1917.
1,338,214.   Patented Apr. 27, 1920.
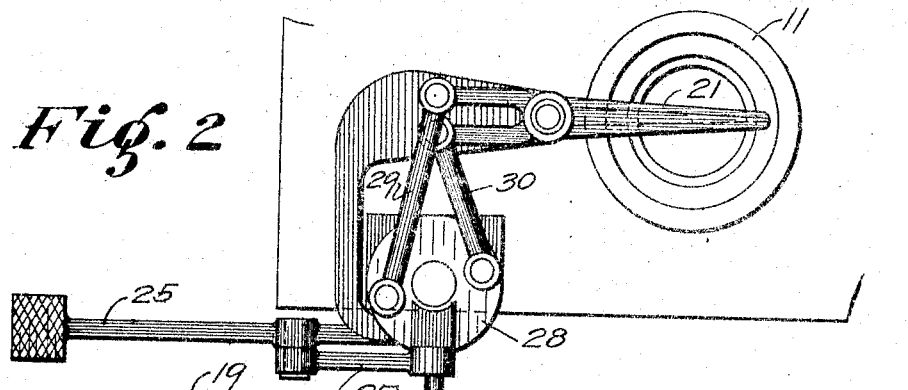
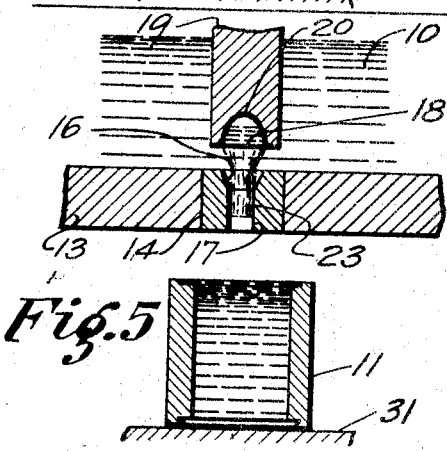
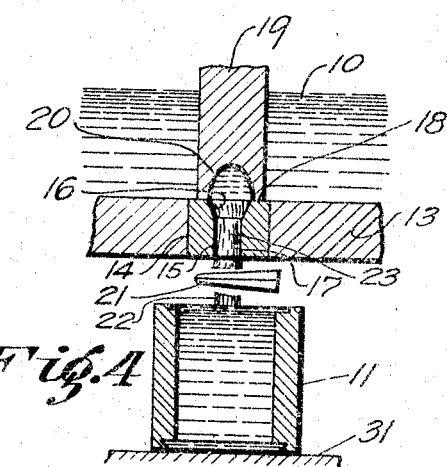
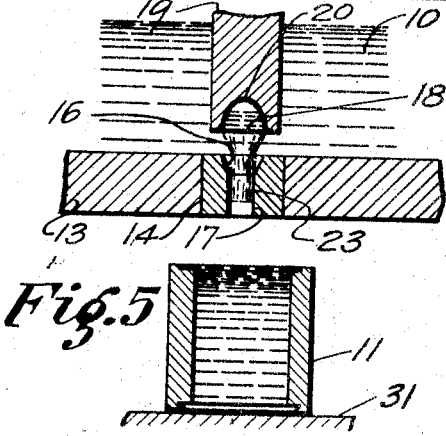
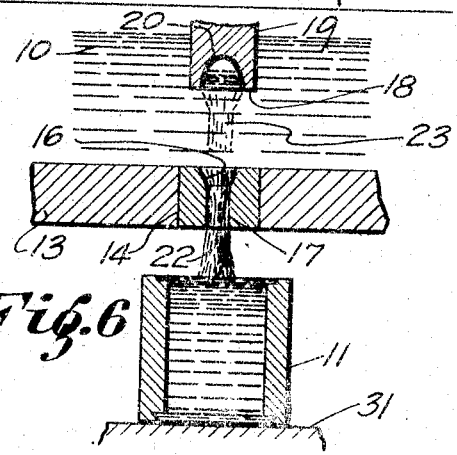
INVENTOR
Scott Davidson &
Alexander L. Schram.
BY
James L. Hopkins,
ATTORNEY

UNITED STATES PATENT OFFICE.

SCOTT DAVIDSON AND ALEXANDER L. SCHRAM, OF HILLSBORO, ILLINOIS, ASSIGNORS TO SCHRAM GLASS MANUFACTURING COMPANY, OF ST. LOUIS, MISSOURI, A CORPORATION OF MISSOURI.

APPARATUS FOR DELIVERING MOLD CHARGES FROM GLASS-FURNACES.

1,338,214.   Specification of Letters Patent.   Patented Apr. 27, 1920.

Application filed July 21, 1917. Serial No. 182,046.

*To all whom it may concern:*

Be it known that we, SCOTT DAVIDSON and ALEXANDER L. SCHRAM, citizens of the United States, residing, respectively, at Hillsboro, in the county of Montgomery and State of Illinois, have invented certain new and useful Improved Apparatus for Delivering Mold Charges from Glass-Furnaces, of which the following is a specification, reference being had therein to the accompanying drawing.

Our invention relates to an improved apparatus for delivering mold charges from glass furnaces, and has for its object to provide an apparatus whereby a series of single charges of molten glass for a mold are successively separated from the molten mass contained in the furnace, and permitted to drop into the mold by gravity. In attaining this ultimate result we have also secured the end of maintaining the temperature of the charge, avoiding the chilling of the depending end of the charge (and consequent discoloration of the finished product) by the means hereinafter described.

As is well known in the art, the high temperature of the molten mass in the glass-furnace must be maintained as nearly as possible in the segregated charge withdrawn for the mold, as otherwise a defective or discolored finished product results. Our invention is directed to keeping the temperature of the mold-charge as near to that of the furnace-content as possible. When a charge is withdrawn from the furnace in a continuous stream, the means employed to cut that stream have of necessity to be used, after the stream is cut, to retard and hold the on-coming portion of the stream above the point of severance. This cutting-means will inevitably chill the molten glass contacting with it and so result in a defective product. The same result occurs from exposure of the molten charge to the atmosphere, or contact of said molten charge with any gas or solid whose temperature is lower than that of the mass in the furnace. It is the problem of averting chilling which our invention solves, by the expedient of delivering the glass from the furnace to the mold by gravity alone, in individual mold-charges or gobs. These gobs depend from the main mass in the furnace when the mold is charged, being connected to the main mass by a more or less attenuated string of the molten material. The string being severed, the portion above the point of severance is returned upwardly to a point in the discharge-orifice above the outer mouth thereof, so that the temperature of the lowest part of the next mold-charge is restored to (approximately) the temperature of the furnace contents, by being made a contiguous part thereof. The chilling of the charge at the point of severance is avoided by having the molten glass above the knife immediately drawn upward and out of contact with the upper surface of the shears or other cutting instrument, so that at no time does said shears support the oncoming charge of glass; the function of the shears is solely and merely that of cutting off, from the viscous molten mass depending from the furnace, a sufficient quantity to charge one mold.

In the drawings—

Fig. 2 is a top plan view of the shears, illustrating their positioning in relation to the mold.

Figs. 3, 4, 5 and 6 illustrate diagrammatically the sequence of the positions of the plunger or valve and the formation of the gob or mold-charge in the operation of delivering the charge to the mold.

Figure 1:
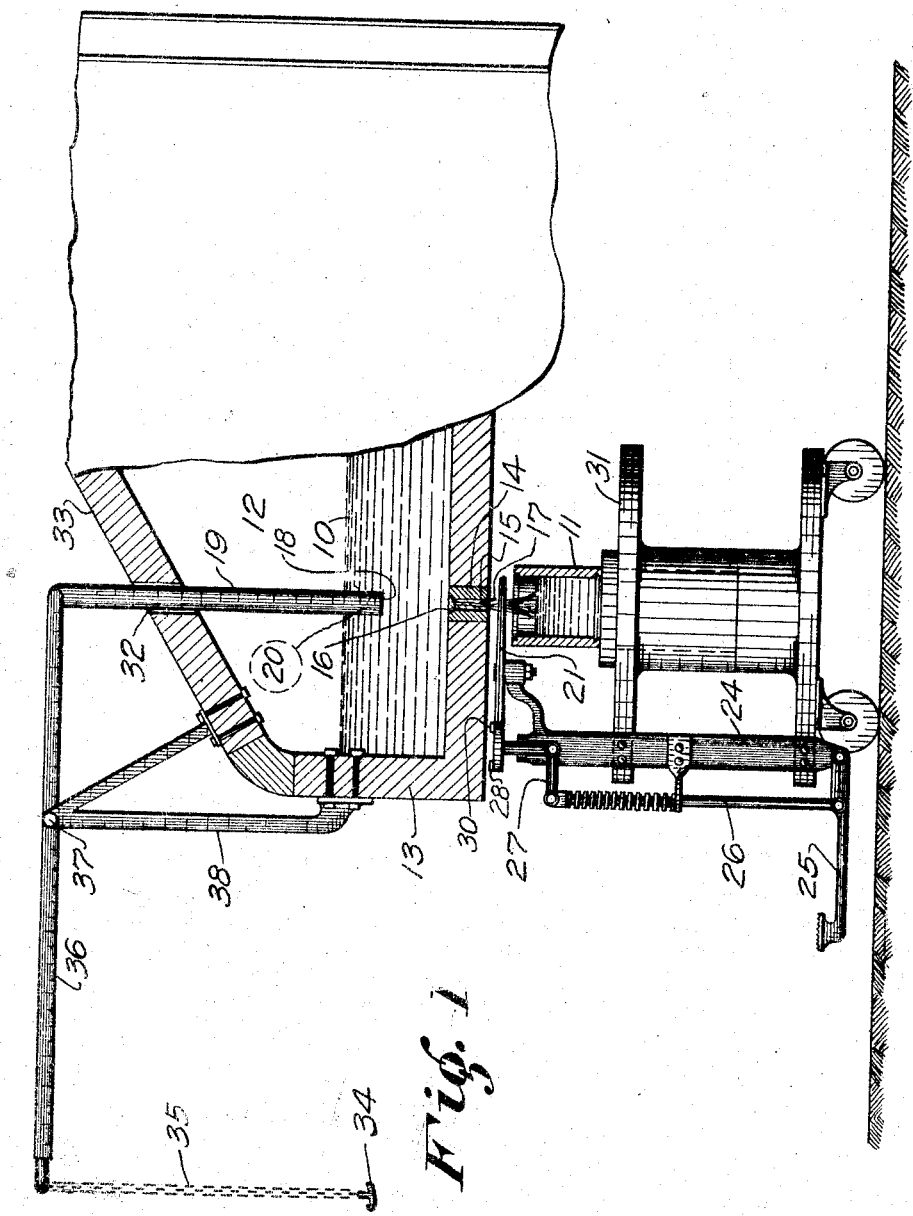
Figure 1 is a side elevation of an apparatus embodying our invention, the glass furnace and mold being shown,—the former partly, the latter wholly,—in section.

As shown in the drawings the molten mass of material 10 to be fed to the molds 11 is contained in the furnace 12. The furnace-bed 13 is apertured to receive the bushing 14 through which the orifice 15 extends. The orifice has an inner mouth 16 and a lower mouth 17, the inner mouth 16 being closed, when the apparatus is at rest, by the lower face 18 of the plunger 19, which face may be concaved to form an inverted, bowl-shaped cavity 20.

Shears 21 serve to sever the gob (or mold-charge) 22 from the column 23 of molten glass remaining in the orifice 15 when the plunger 19 is in closed position (as in Fig. 4).

The shears 21 are mounted on a standard 24 and operated by a foot-lever 25 and its connections (the rod 26, bell-crank lever 27, oscillating disk 28, and links 29 and 30) as shown in Figs. 1 and 2.

The mold 11 is carried on the table 31 to which the standard 24 is secured, the shears- and mold-carrying apparatus being movable into and out of position with reference to the furnace 12.

The plunger 19 is mounted through the aperture 32 in the furnace-top 33; and is operated by the hand-hold 34 through the chain 35 and lever 36, which lever 36 is fulcrumed at 37 in the standard 38.

From the foregoing description of our apparatus, its mode of operation will be readily understood.

When the apparatus is at rest the glass-mass 10 is quiescent in the interior of the furnace 12, the orifice 15 being closed by the plunger 19. A mold 11 being placed in position to receive a charge, the plunger 19 is elevated, permitting the emission of a charge of molten glass through the orifice 15. When the emission is sufficient to constitute a full mold-charge, the shears 21 are actuated to sever the mold-charge 22 from the column 23 of molten glass, which is contained in the orifice 15 and whose projecting tip hangs, when severed, slightly below the orifice-mouth 17 (as in Fig. 4).

That column 23, severed at its top from the furnace-mass 10 by the plunger 19, if the plunger 19 remains closed for more than a minute space of time, will attenuate and fall from the orifice 15. But in the practice of our invention continuous operation is contemplated; the plunger 19 is never at rest long enough (when the apparatus is in operation) to permit the column 23 to drop downward. Practically, as soon as the shears 21 have made the cut, the plunger 19 starts its upward movement, and in so doing it pulls with it the column 23, carrying it upward in the orifice 15 to become contiguous with, an integral part of, and heated by the furnace mass 10 (as in Fig. 5). What causes the column 23 to follow the upward movement of the plunger 19 may be subject to scientific explanation hereafter, but the operation of the apparatus is positively as described, and the result is to elevate the lower extremity of the column 23 so far in the orifice 15 that whatever chill was present at the instant of severance is overcome, and its temperature again becomes that which it originally had before being segregated from the furnace-mass 10.

The operation of the mechanism of our invention in actual practice being as above described we have found that the best results are attained by the use of a plunger having a concaved lower face. But whether the elevation of the cut upper end of the charge through the orifice results from the adhesion of the contents of the orifice to the lower end of the plunger, or whether the cavity on the lower end of the plunger forms and contains a vacuum whereby the contents of the orifice is returned upwardly,—the plunger operating as a suction valve,—we have been unable to determine by experiment. The actual operation of the mechanism demonstrates that the action of the plunger in its upward movement is like that of a piston and has the effect of drawing up the contents of the orifice, merging said contents with the molten mass content of the furnace, and practically restoring the temperature of the orifice contents to that of the glass in the interior of the furnace; with which the column 23 has thoroughly commingled, and of which furnace-contents said column 23 has again become a part, by the time the down-stroke of the plunger 19 has begun; and the discharge of a new mold-charge is effected by gravity alone. The same result may be accomplished by the use of a plunger having a flat lower face, but in practice we have found the upward movement of the glass in the orifice to respond more certainly to the action of a plunger having a cupped concentric cavity 20 in its lower face, as herein illustrated and described.

The amount of the discharge from the furnace will be regulated by the movement of the plunger.

We are aware that it has heretofore been attempted to provide a glass furnace with a cylindrical cavity in its bottom to receive a charge of molten glass, and to force said charge from said cylindrical cavity by a piston operating therein, and we disclaim such construction; our invention employing an apparatus in which the lower face of the plunger when in closed position contacts with the furnace bottom, and does not so contact until the mold-charge is emitted from the furnace; said plunger when moved upwardly drawing with it the superfluous molten glass left above the severance effected by a shears operating below the outer mouth of the orifice through which the mold charge is emitted.

We also disclaim the use of a plunger containing a cavity to which air or steam are admitted to aid in expelling a charge of glass from a glass furnace, the apparatus and method of our invention contemplating only the use of gravity aided by the pressure of the plunger in the emission of the mold-charge.

Having thus described our invention, what we claim as new, and desire to have secured to us by the grant of Letters Patent, is—

1. An apparatus for delivering mold charges from glass furnaces, comprising a furnace capable of containing a body of molten glass and provided with a discharge orifice, through which molten glass may flow by the action of gravity, an imperforate plunger projecting into said furnace and adapted to completely close the upper end of said orifice, the peripheral portion of the lower face of the plunger, being flat and adapted to form a close joint with the upper end of the wall surrounding the discharge orifice, said plunger adapted on its downward stroke to assist the action of gravity in the flow of glass through the orifice, and on its upper stroke to retard said flow.

2. An apparatus for delivering mold charges from glass furnaces, comprising a furnace capable of containing a body of molten glass, and provided with a discharge orifice through which molten glass may flow by the action of gravity, an imperforate plunger provided on its lower end with a con-cavity, projecting into said furnace and adapted to completely close the upper end of said orifice, the peripheral portion of the lower face of the plunger being flat and adapted to form a close joint with the upper end of the wall surrounding the discharge orifice, said plunger adapted on its downward stroke to assist the action of gravity in the flow of glass through the orifice and on its upper stroke to retard said flow.

3. An apparatus for delivering mold charges from glass furnaces, comprising a furnace capable of containing a body of molten glass and provided with a discharge orifice through which molten glass may flow by the action of gravity, glass severing means located below the orifice, an imperforate plunger projecting into said furnace and adapted to completely close the upper end of said orifice and to form a close joint with the walls surrounding the orifice, said plunger acting on its upward stroke to retard the flow of glass within the orifice and to replace the severed end of the stream of glass in a position to be heated by the molten glass contained within the furnace.

In testimony whereof we hereunto affix our signatures.

SCOTT DAVIDSON.
ALEXANDER L. SCHRAM.